United States Patent [19]

Lovelace

[11] Patent Number: 4,976,489
[45] Date of Patent: Dec. 11, 1990

[54] AIR VELOCITY RESPONSIVE SELF DEPLOYING FLEXING AIR DAM

[75] Inventor: Richard R. Lovelace, Clarkson, Mich.

[73] Assignee: General Motors Corporation, Detroit, Mich.

[21] Appl. No.: 498,677

[22] Filed: Mar. 26, 1990

[51] Int. Cl.$^5$ ............................................. B62D 37/02
[52] U.S. Cl. .................................................. 296/180.1
[58] Field of Search ...................................... 296/180.1

[56] References Cited

U.S. PATENT DOCUMENTS

| | | | |
|---|---|---|---|
| 3,618,998 | 11/1971 | Swauger | 296/180.1 |
| 4,119,339 | 10/1978 | Heimburger | 296/180.1 |
| 4,159,140 | 6/1979 | Chabot et al. | 296/180.1 |
| 4,262,954 | 4/1981 | Thompson | 296/180.1 |
| 4,398,764 | 8/1983 | Okuyama | 296/180.1 |
| 4,460,213 | 7/1984 | Janssen et al. | 296/180.1 |
| 4,558,897 | 12/1985 | Okuyama et al. | 296/180.1 |
| 4,585,262 | 4/1986 | Parks | 296/180.1 |
| 4,659,130 | 4/1987 | Dimora et al. | 296/180.1 |
| 4,758,037 | 7/1988 | Suzuki et al. | 296/180.1 |
| 4,778,212 | 10/1988 | Tomforde | 296/180.1 |

Primary Examiner—Robert R. Song
Attorney, Agent, or Firm—Raymond I. Bruttomesso, Jr.

[57] ABSTRACT

An air dam attaches to the underside of a motor vehicle and extends downwardly therefrom into proximity with the road surface and potential interference with curbs or like obstructions extending above the road surface. The air dam is comprised of a generally rectangular flexible sheet with an upper edge and a lower edge defining an air deflecting surface therebetween. A bracket attaches the upper edge of the flexible sheet to the underside of the motor vehicle with the air deflecting surface cantilevered generally horizontally forward from the bracket so that the lower edge is spaced substantially above the road surface. The air deflecting surface is disposed in the oncoming airstream so that the flexible sheet is flexed downwardly progressively in response to the force of air pressure impinging on the air deflecting surface whereby the lower edge remains poised substantially above the road surface to clear obstructions extending above the road surface when the vehicle is traveling at low speeds and extends downwardly into substantial air deflecting proximity with the road surface at high vehicle speed.

4 Claims, 3 Drawing Sheets

AIR VELOCITY RESPONSIVE SELF DEPLOYING FLEXING AIR DAM

The invention relates to an air dam for a motor vehicle and more particularly provides an air dam of flexible material that self deploys by flexing to a deployed position in proximity to the road surface in response to the airstream velocity.

BACKGROUND OF THE INVENTION

It is well known in motor vehicles that the aerodynamics characteristics of the vehicle body can be improved by an air dam mounted underneath the front of the motor vehicle and extending into proximity with the roadway. Such air dams may improve the handling and control of the motor vehicle and also improve the routing of air flow to the engine cooling system.

A disadvantage of the use of an air dam suspended underneath the front of the motor vehicle is that such air dams may be damaged by impact with obstructions such as driveway inclines and curbs. It has also been recognized that the aerodynamic performance of the air dam varies with the speed of the vehicle.

Accordingly, the prior art has recognized the advantage in having the air dam movably mounted beneath the front end structure of the vehicle body for movement between a nondeployed position in which the air dam is raised substantially above the road surface and a deployed position in which the air dam is lowered into proximity with the roadway. At low speeds the air dam remains in the nondeployed position and does not produce added drag when the air dam is not need to redirect the air flow for vehicle control or engine cooling.

In the prior art various hinges and linkages have been provided to enable movement of the air dam between the deployed and the nondeployed positions. In addition, the prior art has taught that the movement of the air dam may be provided by a mechanical or hydraulic actuator which is responsive to the vehicle speed to progressively deploy the air dam as the speed increases. In Chabot et. al. U.S. Pat. No. 4, 159,140 the air dam is mounted by hinges and links and is self deploying by the aerodynamic influence of air pressure acting on the air dam pivoting the air dam downwardly about its hinge and linkage arrangement.

It would be desirable to provide an improved air dam of the self deploying type in which movement between the deployed and the nondeployed positions would be obtained by the inherent flexure characteristic of the air dam structure without necessity for hinges and links and actuators.

SUMMARY OF THE INVENTION

This invention provides an air dam for attachment to the underside of a motor vehicle and extending downwardly therefrom into proximity with the road surface and potential interference with curbs or like obstructions extending above the road surface. The air dam is comprised of a generally rectangular flexible sheet with an upper edge and a lower edge defining an air deflecting surface therebetween. A bracket attaches the upper edge of the flexible sheet to the underside of the motor vehicle with the air deflecting surface cantilevered generally horizontally forward from the bracket so that the lower edge is spaced substantially above the road surface. The air deflecting surface is disposed in the oncoming airstream so that the flexible sheet is flexed downwardly progressively in response to the force of air pressure impinging on the air deflecting surface whereby the lower edge remains poised substantially above the road surface to clear obstructions extending above the road surface when the vehicle is traveling at low speeds and extends downwardly into substantial air defecting proximity with the road surface at high vehicle speed.

One object, feature and advantage of the invention resides in the provision of an air dam structure comprised of a sheet of flexible material having a rear end rigidly attached to the understructure of the vehicle body and a forward end cantilevered into the airstream so that the oncoming airstream induces progressive flexure of the flexible material in proportion to the force applied there against by the oncoming airstream.

Another object, feature, and advantage is that the sheet of flexible material in a deployed position can deflect further back to pass over an obstruction without sustaining damage.

Further objects, features and advantages of the present invention will become more apparent to those skilled in the art as the nature of the invention is better understood from the accompanying drawings and detailed description.

DESCRIPTION OF THE PREFERRED EMBODIMENT

Figure 1:
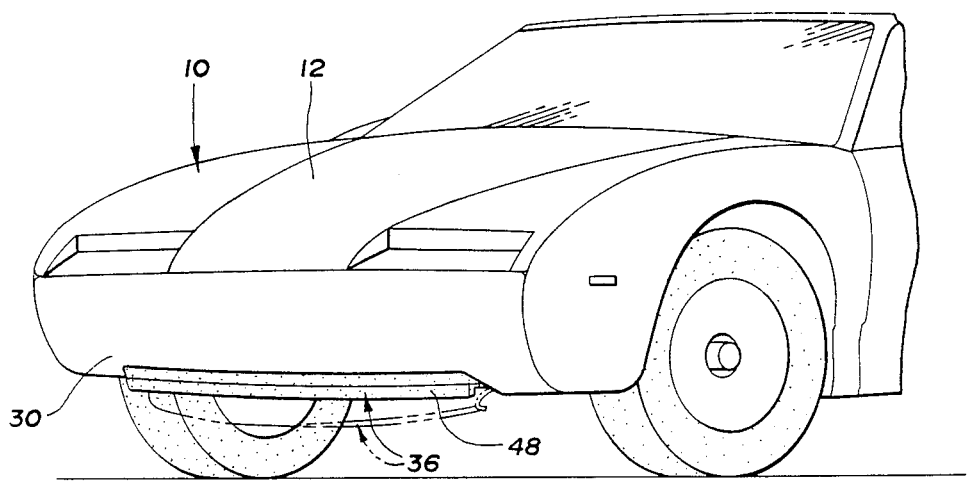
FIG. 1 is a perspective view of the front of a motor vehicle with a retractable flexing air dam in the nondeployed position. The air dam in the partially deployed position is shown in phantom.
Figure 2:
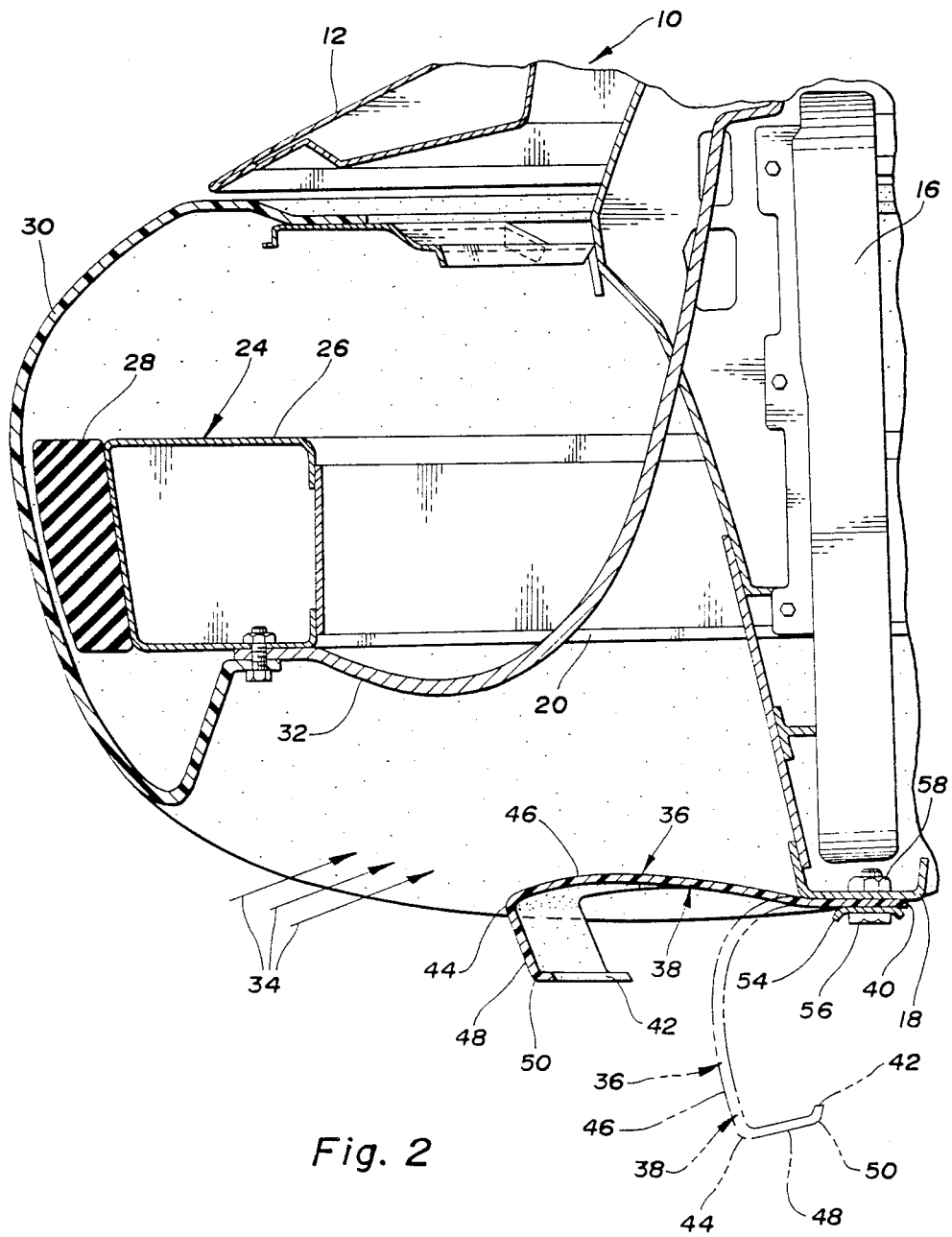
FIG. 2 is a sectional elevation view of the motor vehicle in front of the radiator. The air dam in the deployed position is shown in phantom.

A motor vehicle 10 has a hood 12 as best seen in FIG. 1 which overlies an engine compartment. In FIG. 2, a radiator 16 located under the hood 12 is used to dissipate the heat from an engine.

The radiator 16 is mounted on a cross member 18 which extends between a right side rail frame 20, FIG. 2, and a left side rail frame, not shown. A bumper 24 is comprised of a bumper bar 26 mounted on the front of the rail frames and an absorber 28 mounted on the bumper bar 26. A bumper fascia 30 mounted in front of the bumper bar 26 conceals the bumper 24 and provides a streamlined aerodynamic appearance as shown in FIG. 1 and 2.

An air guide 32 is attached to bottom of the bumper bar 26 and extends upwardly behind the bumper bar 26 to the top of the radiator 16 to guide a flow of air 34 through the radiator 16.

Figure 3:
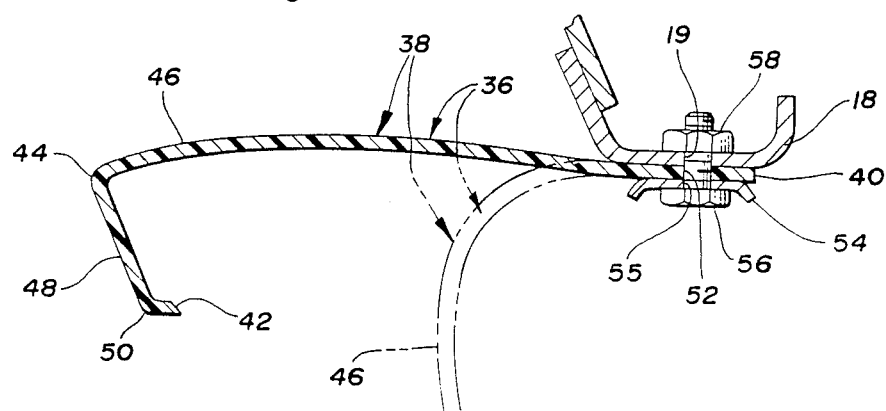
FIG. 3 is an elevation sectional view of the air dam and mounting. The air dam in the deployed position is shown in phantom.
Figure 4:
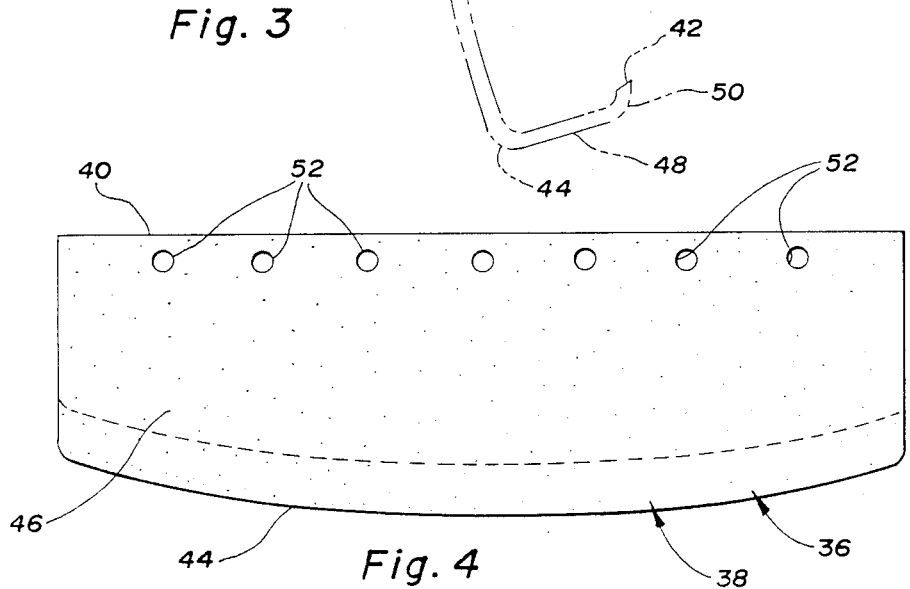
FIG. 4 is a top view of the air dam.

An air dam 36 molded of a flexible rubber or plastic material 38 has an upper edge 40 and a lower edge 42 as best seen in FIG. 2 and 3. A first crease 44 divides the sheet 38 into a primary air deflecting surface 46 and a secondary air deflecting surface 48. The first crease 44 curves, as shown in FIG. 4 so that the secondary air deflecting surface 48 has a profile similar to the bumper fascia 30 as shown in FIG. 1 for appearance reasons. As seen in FIGS. 2 and 3, a second crease 50 is located near the lower edge 42 and adds to the rigidity of the air dam 36.

A series of holes 52 are located near the upper edge 40 of the flexible material 38, as best seen in FIG. 4, for mounting the air dam 36 to the cross member 18 as shown in FIG. 2 and 3. A retaining bar 54 has a set of holes 55 to align with holes 52 in the flexible material 38 and is placed under the flexible material 38 to sandwich the flexible material 38 between the cross member 18 and the retainer bar 54. A set of retaining bolts 56 extend through the holes 55 in the retaining bar 54, the holes 52 in the flexible material 38 and an aligned set of holes 19 in the cross member 18, and are received by a set of retaining nuts 58 as seen in FIG. 3.

When the vehicle 10 is not moving or moving at a relatively slow speed, the primary air deflecting surface 46 is cantilevered generally horizontally forward from the cross member 18. The secondary air deflecting surface 48 projects generally vertical downward and is of a color and texture which compliments the remainder of the vehicle and be aesthetically pleasing.

As the vehicle speed increases, the flow of air 34 impinging on the primary air deflecting surface 46 and the secondary air deflecting surface 48 increases and forces the flexible material 38 to flex over its whole area. The air dam 36 continues to flex downward as the speed increases and reaches the fully deployed position shown in phantom in FIGS. 2 and 3. The upper portion of the flow of air 34 is guided between the air dam 36 and the air guide 32 to pass through the radiator 16. The remainder of the flow that hits the air dam 36 passes under the vehicle 10.

The air dam 36 is in the nondeployed position or only deployed slightly at low speeds when the vehicle 10 is likely to hit obstacles such as a curb. However in the event the vehicle 10 is moving at a rate of speed in which the air dam 36 is deployed and a obstruction such as a rock or small animal passes under the vehicle 10, the flexible material 38 would flex further back to pass over the obstruction. The air dam 36 would return to the position related to the force of air after it had passed over the obstruction. When the vehicle 10 is going in reverse the air dam 36 remains in the nondeployed position, since there is no flow of air hitting the primary air deflecting surface 46 or secondary air deflecting surface 48 that would cause the flexible material 38 to deflect.

While the air dam 36 is shown as having an uniform thickness, and material, the air dam can have varying thickness or material properties to vary the stiffness over the air dam. For example, the air dam could be tapered or have ribs to vary the stiffness.

Second Embodiment

Figure 5:
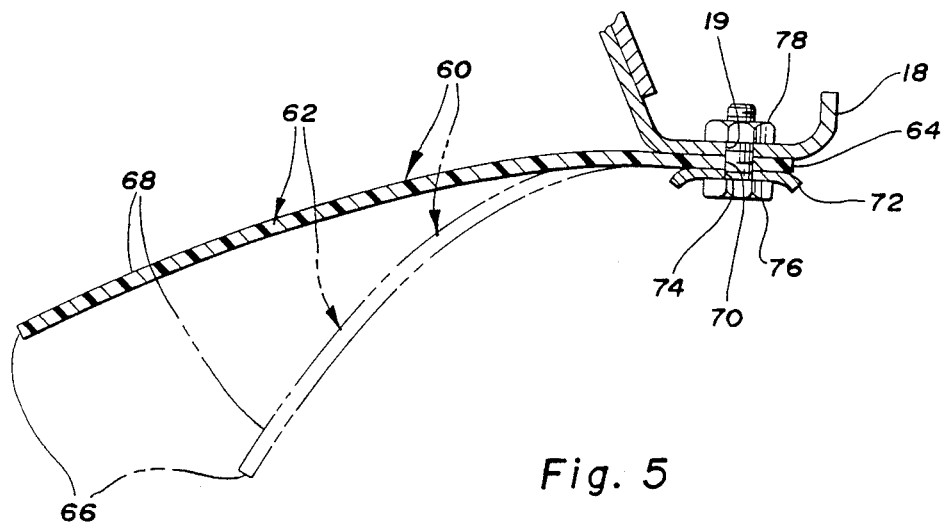
FIG. 5 is an elevation sectional view of a second embodiment of the air dam. The air dam in the deployed position is shown in phantom.

FIG. 5 shows a second embodiment of an air dam 60 made from a flat sheet of rubber stamped or cut to form a flexible sheet 62 which has a upper edge 64 and a lower edge 66 defining an air deflecting surface 68. A series of holes 70 are located near the upper edge 64 of the flexible sheet 62 for mounting the air dam 60 to the cross member 18. A retaining bar 72 has a series of holes 74 to match the holes 70 in the flexible sheet 62 and is placed under the flexible sheet 62 to sandwich the flexible sheet 62 between the cross member 18 and the retainer bar 72. A set of retaining bolts 76 extended through the holes 74 in the retaining bar 72, and the holes 70 in the flexible sheet 62 and align with the holes 19 in the cross bar 18 and are received by a set of retaining nuts 78. The air dam 60 is in the nondeployed position when the vehicle 10 is not moving and the air dam 60 presence in a vehicle elevation view is minimal.

As the vehicle speed increases, the flow of air hitting the air deflecting surface 68 increases and forces the flexible sheet 62 to flex over its whole area beginning near the upper edge 64. The air dam 60 continues to flex downward as the speed increases and reaches the fully deployed position shown in phantom in FIG. 5.

Third Embodiment

Figure 6:
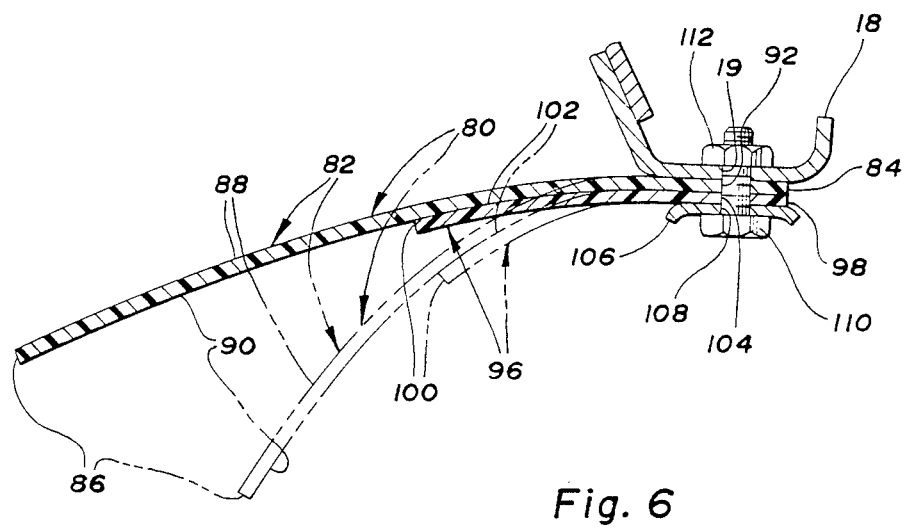
FIG. 6 is an elevation sectional view of a third embodiment of the air dam. The air dam in the deployed position is shown in phantom.

A third embodiment as shown in FIG. 6 of an air dam 80 made of a first flexible sheet of rubber 82 which has a upper edge 84 and a lower edge 86 defining an air deflecting surface 88 and a back surface 90. A series of holes 92 are located near the upper edge 84 of the first flexible sheet 82 for mounting the air dam 80 to the cross member 18.

A second flexible sheet 96 having a upper edge 98 and a lower edge 100 and defines a support surface 102 of smaller surface area than the back surface 90 of the first flexible sheet 82. The support surface 102 of the second flexible sheet 96 underlie and supports a portion of the back surface 90 of the first flexible sheet 82 to thereby vary the flexing or bending characteristic of the air dam 80 in relation to the flow of the air. The upper edge 84 of the first flexible sheet 82 aligns with the upper edge 98 of the second flexible sheet 96. A series of holes 104 are located near the upper edge 98 of the second flexible sheet 96 which align with the holes 92 in the first flexible sheet 82 for mounting the air dam 80 to the cross member 18.

A retaining bar 106, having a series of holes 108 to match the holes 92 and 104 in the flexible sheets 82 and 96, is placed under the flexible sheets 82 and 96 to sandwich them 82 and 96 between the retainer bar 106 and the cross member 18. A set of retaining bolts 110 extend through the holes 108 in the retaining bar 106, the holes 104 in the second flexible sheet 96, the holes 104 in the first flexible sheet 82, the holes 19 in the cross bar 18 and are received by a set of retaining nuts 112. The air dam 80 is in the nondeployed position when the vehicle is not moving and the air dam 80 is substantially concealed from view.

As the vehicle speed increases, the flow of air hitting the air deflecting surface 88 increases and forces the flexible sheets 82 and 96 to flex over their whole lengths. The air dam 80 continues to flex downwardly as the speed increases and reaches the fully deployed position shown in phantom in FIG. 6. The first flexible sheet 82 will bend differently in the portion that is supported by the support surface 102 of the second flexible sheet 96 than in the portion that is not supported and this difference will vary with the stiffness of the second flexible sheet 96.

While three embodiments of the present invention have been explained, various modifications within the spirit and scope of the following claims will be readily apparent to those skilled in the art.

The embodiments of the invention in which an exclusive property or privilege is claimed are defined as follows:

1. An air dam for attachment to the underside of a motor vehicle and extending downwardly therefrom into proximity with the road surface and potential interference with curbs or like obstructions extending above the road surface, comprising:

a generally rectangular flexible sheet having an upper edge and a lower edge defining an air deflecting surface therebetween; and means attaching the upper edge of the flexible sheet on the underside of the motor vehicle with the air deflecting surface cantilevered generally horizontally forward from the attaching means so that the lower edge is spaced substantially above the road surface in an undeployed position and with the air deflecting surface being disposed in the oncoming airstream so that the flexible sheet is flexed downwardly progressively in response to the force of air pressure impinging on the air deflecting surface to a full deployed position whereby the lower edge remains poised substantially above the road surface to clear obstructions extending above the road surface when the vehicle is traveling at low speeds and extends downwardly into substantial air defecting proximity with the road surface at high vehicle speed.

2. An air dam for attachment to the underside of a motor vehicle and extending downwardly therefrom into proximity with the road surface and potential interference with curbs or like obstructions extending above the road surface, comprising:

a first generally rectangular flexible sheet having an upper edge and a lower edge defining an air deflecting surface and a back surface therebetween;

a second generally rectangular flexible sheet having an upper edge and a lower edge defining a support surface of a smaller size than the back surface of the first flexible sheet; and means attaching the upper edges of the flexible sheets on the underside of the motor vehicle with the air deflecting surface cantilevered generally horizontally forward from the attaching means so that the lower edges are spaced substantially above the road surface and with the air deflecting surface being disposed in the oncoming airstream so that the flexible sheets are flexed downwardly progressively in response to the force of air pressure impinging on the air deflecting surface and the support surface of the second flexible sheet adjoin the back surface of the first flexible sheet for varying the flexing characteristic of the first flexible sheet whereby the lower edge of the first flexible sheet remains poised substantially above the road surface to clear obstructions extending above the road surface when the vehicle is traveling at low speeds and extends downwardly into substantial air defecting proximity with the road surface at high vehicle speed.

3. An air dam for attachment to the underside of a motor vehicle and extending downwardly therefrom into proximity with the road surface and potential interference with curbs or like obstructions extending above the road surface, comprising:

a flexible sheet having an upper edge and a lower edge, a crease in the flexible sheet defining a primary air deflecting surface between the upper edge and the crease and defining a secondary air deflecting surface between the crease and the lower edge, the secondary air deflecting surface extending generally perpendicular to the primary air deflecting surface; and means attaching the upper edge of the flexible sheet on the underside of the motor vehicle with the primary air deflecting surface cantilevered generally horizontally forward from the attaching means and the secondary air deflecting surface projecting general downward vertical, so that the lower edge is spaced substantially above the road surface and with the air deflecting surface being disposed in the oncoming airstream so that the flexible sheet is flexed downwardly progressively in response to the force of air pressure impinging on the air deflecting surface whereby the lower edge remains poised substantially above the road surface to clear obstructions extending above the road surface when the vehicle is traveling at low speeds and extends downwardly into substantial air defecting proximity with the road surface at high vehicle speed.

4. An air dam for attachment to the underside of a a motor vehicle for directing a flow of air to a radiator from a underside of the motor vehicle comprising:

a flexible sheet having an upper edge and a lower edge, a crease in the flexible sheet defining a primary air deflecting surface between the upper edge and the crease and defining a secondary air deflecting surface between the crease and the lower edge, the secondary deflecting surface extending generally perpendicular to the primary air deflecting surface;

means attaching the upper edge of the flexible sheet on the underside of the motor vehicle with the primary air deflecting surface cantilevered generally horizontally forward from the attaching means and the secondary air deflecting surface projecting general downward vertical, so that the lower edge is spaced substantially above the road surface and with the air deflecting surface being disposed in the oncoming airstream so that the flexible sheet is flexed downwardly progressively in response to the force of air pressure impinging on the air deflecting surface and the lower edge of the flexible sheet remains poised substantially above the road surface to clear obstructions extending above the road surface when the vehicle is traveling at low speeds and extends downwardly into substantial air defecting proximity with the road surface at high vehicle speed and define the lower region of the air flow to the radiator; and an air guide mounted from the underside of the bumper to the top of the radiator for defining the upper region of the air flow to the radiator.

* * * * *